United States Patent
Dou et al.

(10) Patent No.: US 11,363,451 B2
(45) Date of Patent: Jun. 14, 2022

(54) INFORMATION TRANSMISSION METHOD AND APPARATUS

(71) Applicant: HUAWEI TECHNOLOGIES CO., LTD., Guangdong (CN)

(72) Inventors: Shengyue Dou, Shanghai (CN); Ting Wang, Shanghai (CN); Yuanjie Li, Shanghai (CN); Jing Liu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 36 days.

(21) Appl. No.: 16/672,927

(22) Filed: Nov. 4, 2019

(65) Prior Publication Data

US 2020/0068387 A1 Feb. 27, 2020

Related U.S. Application Data

(63) Continuation of application No. PCT/CN2018/085736, filed on May 4, 2018.

(30) Foreign Application Priority Data

May 5, 2017 (CN) .......................... 201710316830.9

(51) Int. Cl.
  *H04W 8/24* (2009.01)
  *H04W 72/04* (2009.01)
  (Continued)

(52) U.S. Cl.
  CPC .......... *H04W 8/24* (2013.01); *H04B 1/71075* (2013.01); *H04W 72/042* (2013.01); *H04W 76/27* (2018.02); *H04W 80/08* (2013.01)

(58) Field of Classification Search
  None
  See application file for complete search history.

(56) References Cited

U.S. PATENT DOCUMENTS

2011/0188462 A1 8/2011 Yoo et al.
2012/0252447 A1* 10/2012 Sartori ............... H04W 24/10
                                                    455/434

(Continued)

FOREIGN PATENT DOCUMENTS

CN 102281127 A 12/2011
CN 102725989 A 10/2012

(Continued)

OTHER PUBLICATIONS

3GPP TS 36.213 V14.2.0 (Mar. 2017),3rd Generation Partnership Project;Technical Specification Group Radio Access Network,Evolved Universal Terrestrial Radio Access (E-UTRA); Physical layer procedures(Release 14),dated Mar. 2017,total 454 pages.

(Continued)

*Primary Examiner* — Eunsook Choi
(74) *Attorney, Agent, or Firm* — Womble Bond Dickinson (US) LLP

(57) ABSTRACT

Embodiments of this application disclose an information transmission method and an apparatus. The method includes: sending, by a terminal to a base station, capability indication information used to indicate whether the terminal supports non-coherent joint transmission; and receiving downlink control information sent by the base station, where the downlink control information is based on the capability indication information. According to the embodiments of this application, the base station can know whether the terminal supports NCJT, so as to select an appropriate transmission mode.

20 Claims, 5 Drawing Sheets

(51) Int. Cl.
*H04W 76/27* (2018.01)
*H04B 1/7107* (2011.01)
*H04W 80/08* (2009.01)

(56) References Cited

U.S. PATENT DOCUMENTS

| | | | |
|---|---|---|---|
| 2013/0343301 A1* | 12/2013 | Geirhofer | H04B 7/024 370/329 |
| 2014/0036809 A1* | 2/2014 | Xu | H04W 52/325 370/329 |
| 2014/0146756 A1* | 5/2014 | Sahin | H04L 5/0055 370/329 |
| 2015/0029910 A1* | 1/2015 | He | H04W 24/02 370/280 |
| 2015/0049692 A1 | 2/2015 | Ding et al. | |
| 2015/0256306 A1 | 9/2015 | Kim et al. | |
| 2015/0341949 A1 | 11/2015 | Nagata et al. | |
| 2017/0288743 A1* | 10/2017 | Nam | H04L 5/0035 |
| 2018/0042028 A1* | 2/2018 | Nam | H04B 7/0626 |
| 2018/0048372 A1* | 2/2018 | Sun | H04B 7/0639 |
| 2018/0123744 A1* | 5/2018 | Nogami | H04L 5/0053 |
| 2019/0124627 A1* | 4/2019 | Park | H04W 72/0446 |
| 2019/0158259 A1* | 5/2019 | Park | H04L 1/0061 |
| 2019/0261329 A1* | 8/2019 | Park | H04L 5/0048 |
| 2019/0379431 A1* | 12/2019 | Park | H04W 72/04 |
| 2020/0304256 A1* | 9/2020 | Park | H04L 5/0048 |
| 2021/0219313 A1* | 7/2021 | Matsumura | H04W 72/0453 |

FOREIGN PATENT DOCUMENTS

| | | |
|---|---|---|
| CN | 106358297 A | 1/2017 |
| GN | 102036311 A | 4/2011 |
| WO | 2013192482 A1 | 12/2013 |

OTHER PUBLICATIONS

3GPP TS 36.211 V14.2.0 (Mar. 2017),3rd Generation Partnership Project;Technical Specification Group Radio Access Network,Evolved Universal Terrestrial Radio Access (E-UTRA); Physical channels and modulation(Release 14),total 196 pages.

Huawei Hisilicon: "Multi-panel based DL MIMO transmission",3GPP Draft; R1-1611664,Nov. 13, 2016 (Nov. 13, 2016),XP051175636, total 4 pages.

Nokia Alcatel-Lucent Shanghai Bell: "Control signalling enhancement for NCJT:single DCI or multiple DCI".3GPP Draft; R1-1706160,Mar. 31, 2017 (Mar. 31, 2017), XP051252435, total 2 pages.

CATT: "on codeword-to-layer mapping",3GPP Draft; R1-1702069,Feb. 12, 2017 (Feb. 12, 2017),XP051209230 , total 4 pages.

3GPP TS 38.331 V0.0.2 (Mar. 2017), 3rd Generation Partnership Project; Technical Specification Group Radio Access Network; NR; Radio Resource Control (RRC); Protocol specification(Release 15 ), 13 pages.

* cited by examiner

INFORMATION TRANSMISSION METHOD AND APPARATUS

CROSS-REFERENCE TO RELATED APPLICATIONS

This application is a continuation of International Application No. PCT/CN2018/085736, filed on May 4, 2018, which claims priority to Chinese Patent Application No. 201710316830.9, filed on May 5, 2017. The disclosures of the aforementioned applications are hereby incorporated by reference in their entireties.

TECHNICAL FIELD

This application relates to the field of communications technologies, and in particular, to an information transmission method and an apparatus.

BACKGROUND

With explosive growth of a network communication capacity, an evolution requirement of a wireless communications technology oriented to a fifth generation mobile communications technology (5G) is clearer and more urgent, and begins to draw great attention of the industry. In evolution of the 5G-oriented wireless communications technology, in one aspect, a conventional wireless communications performance indicator, such as a network capacity and spectrum efficiency, needs to be continuously improved, to further improve limited and increasingly strained wireless spectrum utilization. In another aspect, richer communication modes and improvement of user experience of a terminal and expansion of a cellular communication application that are brought from the richer communication modes are also an evolution direction that needs to be considered. As a 5G-oriented key candidate technology, that non-coherent joint transmission (NCJT) needs to be supported is clear in both long term evolution (LTE) and 5G new radio (NR). However, how to support implementation of the NCJT is an urgent problem to be resolved.

SUMMARY

To resolve the foregoing technical problem, embodiments of this application provide an information transmission method and an apparatus, so that NCJT can be effectively used.

According to a first aspect, an embodiment of this application provides an information transmission method, and the method may include:

sending, to a base station, capability indication information used to indicate whether a terminal supports non-coherent joint transmission; and receiving downlink control information from the base station, where the downlink control information is based on the capability indication information.

The terminal reports the capability indication information indicating whether the terminal supports the NCJT, so that the base station can accurately know whether the terminal supports the NCJT, and then select an appropriate transmission mode to send appropriate DCI. In this way, transmission of useless information caused by unclear information can be avoided, thereby improving system efficiency, and facilitating normal running of the NCJT.

In one embodiment, the method further includes:

receiving a parameter of the downlink control information from the base station, where the parameter includes a downlink control information format and/or a maximum quantity of to-be-sent downlink control information, and the parameter is based on the capability indication information.

The terminal may perform blind detection based on these parameters, and determine the DCI format that needs to be detected and a quantity of DCI that needs to be detected.

In one embodiment, the capability indication information is used to indicate whether the terminal supports receiving of at least two pieces of downlink control information and/or is used to indicate whether the terminal supports the downlink control information format corresponding to the non-coherent joint transmission.

An explicit capability indication helps the base station accurately and quickly know a capability of the terminal, so as to select an appropriate transmission mode.

In one embodiment, the capability indication information includes at least one of the following information:

a maximum quantity of information transmission layers that is supported by the terminal;

a maximum throughput supported by the terminal;

a maximum quantity of code words that is supported by the terminal; and whether the terminal has a capability of a successive interference cancellation receiver or a parallel interference cancellation receiver.

Capability information indicating that the terminal supports the NCJT is implicitly indicated by using the foregoing information or a combination of any two or more pieces of information, and there is no need to design a new capability indication reference element, thereby facilitating compatibility with a system.

In one embodiment, the capability indication information is carried in higher layer signaling.

For example, the capability indication information may be carried in a UE capability indication field of the higher layer signaling, and that the capability indication information is carried by using the higher layer signaling facilitates compatibility with a system.

According to a second aspect, an embodiment of this application provides an information transmission method, including:

receiving capability indication information that is sent by a terminal and that is used to indicate whether the terminal supports non-coherent joint transmission; and sending downlink control information to the terminal based on the capability indication information.

In one embodiment, the sending downlink control information to the terminal based on the capability indication information includes:

determining a parameter of the downlink control information based on the capability indication information and whether the base station supports the non-coherent joint transmission; or determining a parameter of the downlink control information based on the capability indication information, whether the base station supports the non-coherent joint transmission, and a current channel status, where the parameter includes a downlink control information format and/or a maximum quantity of to-be-sent downlink control information;

sending the parameter to the terminal by using downlink control information or higher layer signaling, to indicate, to the terminal, the downlink control information format that needs to be detected and/or a quantity of downlink control information that needs to be detected; and sending the downlink control information to the terminal based on the parameter.

The base station selects an appropriate transmission mode based on a capability of the base station and a capability of the terminal and/or the current channel status, and configures and sends the parameter of the corresponding DCI. This is applicable to various devices and various channel statuses, so that system adaptability is improved.

In one embodiment, the capability indication information is used to indicate whether the terminal supports receiving of at least two pieces of downlink control information and/or is used to indicate whether the terminal supports the downlink control information format corresponding to the non-coherent joint transmission.

In one embodiment, the capability indication information includes at least one of the following information:

a maximum quantity of information transmission layers that is supported by the terminal;

a maximum throughput supported by the terminal;

a maximum quantity of code words that is supported by the terminal; and whether the terminal has a capability of a successive interference cancellation receiver or a parallel interference cancellation receiver.

In one embodiment, the capability indication information is included in higher layer signaling.

According to a third aspect, an embodiment of this application provides an apparatus, and the apparatus may include:

a sending unit, configured to send, to a base station, capability indication information used to indicate whether a terminal supports non-coherent joint transmission; and a receiving unit, configured to receive downlink control information from the base station, where the downlink control information is based on the capability indication information.

The apparatus may be a terminal or a chip, for example, may be a chip disposed in a terminal.

In one embodiment, the receiving unit is further configured to receive a parameter of the downlink control information from the base station, where the parameter includes a downlink control information format and/or a maximum quantity of to-be-sent downlink control information, and the parameter is based on the capability indication information.

In one embodiment, the capability indication information is used to indicate whether the terminal supports receiving of at least two pieces of downlink control information and/or is used to indicate whether the terminal supports the downlink control information format corresponding to the non-coherent joint transmission.

In one embodiment, the capability indication information includes at least one of the following information:

a maximum quantity of information transmission layers that is supported by the terminal;

a maximum throughput supported by the terminal;

a maximum quantity of code words that is supported by the terminal; and whether the terminal has a capability of a successive interference cancellation receiver or a parallel interference cancellation receiver.

In one embodiment, the capability indication information is carried in higher layer signaling.

According to a fourth aspect, an embodiment of this application provides an apparatus, and the apparatus may include:

a processor and a memory, where the memory is configured to store a group of program code, and the processor is configured to invoke the program code stored in the memory, so that the apparatus performs the method according to any one of the embodiments of the first aspect.

The apparatus may be a terminal or a chip, for example, may be a chip disposed in a terminal.

According to a fifth aspect, an embodiment of this application provides an apparatus, and the apparatus may include:

a receiving unit, configured to receive capability indication information that is sent by a terminal and that is used to indicate whether the terminal supports non-coherent joint transmission; and a sending unit, configured to send downlink control information to the terminal based on the capability indication information.

The apparatus may be a base station or a chip, for example, may be a chip disposed in a base station.

In one embodiment, the apparatus further includes:

a processing unit, configured to: determine a parameter of the downlink control information based on the capability indication information and whether the base station supports the non-coherent joint transmission; or determine a parameter of the downlink control information based on the capability indication information, whether the base station supports the non-coherent joint transmission, and a current channel status, where the parameter includes a downlink control information format and/or a maximum quantity of to-be-sent downlink control information; where the sending unit is further configured to: send the parameter to the terminal by using downlink control information or higher layer signaling, to indicate, to the terminal, the downlink control information format that needs to be detected and/or a quantity of downlink control information that needs to be detected; and send the downlink control information to the terminal based on the parameter.

In one embodiment, the capability indication information is used to indicate whether the terminal supports receiving of at least two pieces of downlink control information and/or is used to indicate whether the terminal supports the downlink control information format corresponding to the non-coherent joint transmission.

In one embodiment, the capability indication information includes at least one of the following information:

a maximum quantity of information transmission layers that is supported by the terminal;

a maximum throughput supported by the terminal;

a maximum quantity of code words that is supported by the terminal; and whether the terminal has a capability of a successive interference cancellation receiver or a parallel interference cancellation receiver.

In one embodiment, the capability indication information is included in higher layer signaling.

According to a sixth aspect, an embodiment of this application provides an apparatus, and the apparatus may include:

a processor and a memory, where the memory is configured to store a group of program code, and the processor is configured to invoke the program code stored in the memory, so that the apparatus performs the method according to any one of the embodiments of the second aspect. The apparatus may be a base station or a chip, for example, may be a chip disposed in a base station.

According to a seventh aspect, an embodiment of this application provides a computer readable storage medium. The computer readable storage medium stores an instruction. When the instruction runs on a computer, the method according to any one of the embodiments of the first aspect is implemented.

According to an eighth aspect, an embodiment of this application provides a computer readable storage medium. The computer readable storage medium stores an instruction. When the instruction runs on a computer, the method according to any one of the embodiments of the second aspect is implemented.

BRIEF DESCRIPTION OF DRAWINGS

To describe the technical solutions in the embodiments of this application or in the background more clearly, the following describes the accompanying drawings required for describing the embodiments of this application or the background.

DESCRIPTION OF EMBODIMENTS

With continuous development of communications technologies, and rapid growth of a service scale, a message quantity, and a terminal quantity, in a future 5G communications system or a higher level communications system, non-coherent joint transmission becomes one of important technical means for increasing a peak throughput of an edge user. In non-coherent joint transmission, each transmission point uses an independent precoding scheme to send different MIMO data streams or layers to same user equipment, and a receive end, namely, the user equipment, may simultaneously receive a plurality of MIMO data streams from different transmission points, so that a peak throughput of a user is increased, and service quality of an edge user is improved.

In an existing protocol of Rel-11, a transmission mode for coordinated multipoint transmission/reception (CoMP) is a TM 10, and a corresponding physical layer downlink control information (DCI) format is a DCI format 2D. To support NCJT, there are two possibilities for a DCI format in NCJT in Rel-15 LTE. (1) The DCI format 2D keeps unchanged (e.g., a payload size of DCI keeps unchanged). (2) A new DCI format is designed, for example, a DCI format 2E is designed for NCJT. For 5G, NCJT may be supported by using one or more pieces of DCI.

However, for new user equipment (UE) in LTE Rel-15, namely, Rel-15 UE, due to limitations of power consumption and a computing capability, some new UEs in Rel-15 may not support the NCJT. In this case, if the new DCI format 2E is added, the UEs cannot identify the DCI format 2E. Similarly, UE in NR, namely, NR UE, may not support reception of a plurality of pieces of DCI. Consequently, the NCJT cannot be performed.

This application provides a solution, so that NCJT can be effectively used.

The following describes the embodiments of this application with reference to accompanying drawings in the embodiments of this application. In the specification, claims, and accompanying drawings of this application, the terms "first", "second", and the like are intended to distinguish between different objects but are not intended to describe a particular order. Moreover, the terms "include", "have", and any other variants thereof are intended to cover non-exclusive inclusion. For example, a process, a method, a system, a product, or a device that includes a series of operations or units is not limited to the listed operations or units, but in one embodiment, further includes an unlisted operation or unit, or in one embodiment, further includes another inherent operation or unit of the process, the method, the product, or the device.

Figure 1:
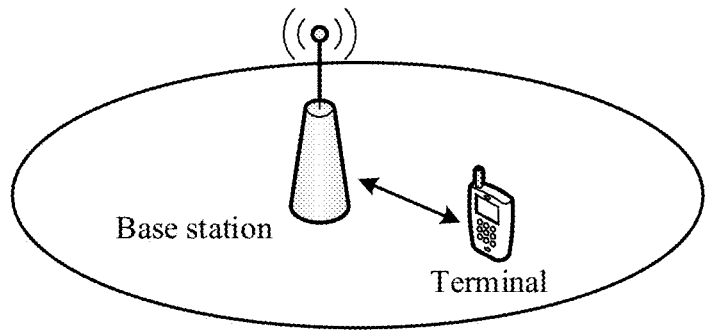
FIG. 1 is a schematic architectural diagram of a communications system according to an embodiment of this application.

FIG. 1 is a schematic architectural diagram of a communications system according to an embodiment of this application. The communications system may include but is not limited to:

a base station and a terminal, where the terminal may also be referred to as user equipment (UE).

The base station may be an evolved NodeB (eNB), a NodeB (NB), a transmission and reception point (TRP) or a gNB in 5G NR, a base station controller (BSC), a base transceiver station (BTS), a home base station (for example, Home evolved NodeB, or Home NodeB, HNB), a baseband unit (BBU), or the like. A person skilled in the art may alternatively call the base station a base station transceiver, a radio base station, a radio transceiver, a transceiver function, a base station subsystem (BSS), or some other appropriate terms. The base station may receive capability indication information that is reported by the terminal and that is used to indicate whether the terminal supports non-coherent joint transmission, and configure and deliver downlink control information.

The terminal may include a cellular phone, a smartphone, a session initiation protocol (SIP) phone, a laptop computer, a personal digital assistant (PDA), satellite radio, a global positioning system, a multimedia device, a video device, a digital audio player (for example, an MP3 player), a camera, a vehicle-mounted device, a game console, or any other device with a similar function. A person skilled in the art may call the terminal a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handheld device, a user agent, a mobile client, a client, or some other appropriate terms. The terminal may report capability indication information used to indicate whether the terminal supports non-coherent joint transmission, then receive downlink control information delivered by the base station, and perform information transmission based on the received downlink control information.

The following describes in detail an information transmission method in this application with reference to FIG. 2 to FIG. 5.

Figure 2:
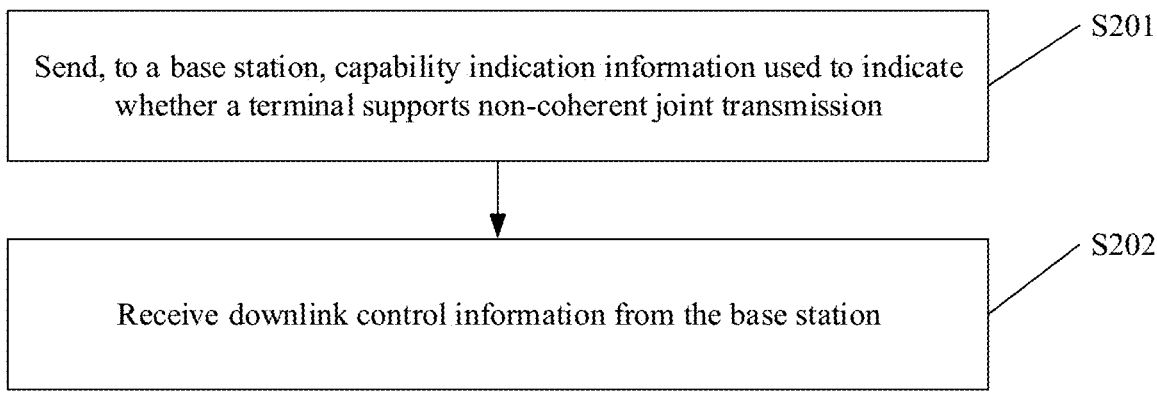
FIG. 2 is a schematic flowchart of an information transmission method according to an embodiment of this application.

FIG. 2 is a schematic flowchart of an information transmission method according to an embodiment of this application. The method includes but is not limited to the following operations.

S201. Send, to a base station, capability indication information used to indicate whether a terminal supports non-coherent joint transmission.

S202. Receive downlink control information from the base station.

The downlink control information is based on the capability indication information.

In one embodiment, in operation S201, the capability indication information may be used to indicate whether the terminal supports receiving of at least two pieces of downlink control information and/or may be used to indicate whether the terminal supports a downlink control information format corresponding to the non-coherent joint transmission. In one embodiment, the terminal may explicitly notify the base station whether the terminal has a capability of supporting the NCJT. A plurality of pieces of DCI may be delivered to implement the NCJT. Therefore, the terminal may directly and explicitly notify the base station whether the terminal supports receiving of at least two pieces of DCI. Certainly, in another manner of implementing the NCJT, a new DCI format such as a DCI format 2E may be designed. In this case, the terminal may explicitly notify the base station whether the terminal supports the DCI format corresponding to the NCJT, for example, whether the terminal supports the DCI format 2E.

The base station may clearly know capability information of the terminal through explicit indication, and then delivers DCI based on the capability information of the terminal, so that transmission of useless information can be avoided, and system efficiency can be improved.

It should be noted that, to implement the NCJT, whether receiving of at least two pieces of DCI is supported means whether receiving of at least two pieces of DCI on a same carrier is supported. In addition, in one embodiment, when sending the capability indication information, the terminal may send the capability indication information by using higher layer signaling, for example, sending the capability indication information by using media access control (MAC) layer signaling or by using radio resource control (RRC) signaling. This is not limited in this embodiment of the present application.

The terminal may send the capability indication information by reconstructing signaling. For example, for the RRC signaling, an indication indicating whether the NCJT is supported may be added to a UE evolved universal terrestrial radio access capability information element (UE-EU-TRA-Capability information element) of the RRC signaling:

```
UE-EUTRA-Capability information element
UE-EUTRA-Capability-v13x0-IEs ::= SEQUENCE {
    dc-Parameters-v13x0           DC-Parameters-v13x0    OPTIONAL,
    measParameters-v13xy          MeasParameters-v13xy   OPTIONAL,
    ...
}
UE-EUTRA-Capability-v14x0-IEs ::= SEQUENCE {
    NCJT-Parameters-v14x0    NCJT- Parameters-v13x0 OPTIONAL,
}
NCJT-Parameters-r14
```

This field defines whether NCJT as specified in TS 36.213 [22] is supported by the UE.

The above content shows newly added content in the RRC signaling, and is used to indicate whether the terminal supports the NCJT.

In one embodiment, "NCJT" in the above part may be replaced with "multiple DCI" or "DCI format 2E" (the DCI format 2E is used to indicate a DCI format used to support the NCJT, and a format name may also be another name. This is not limited in this embodiment of the present application).

In one embodiment, when the DCI format supporting the NCJT is used to indicate whether the NCJT is supported, a DCI format supported by the terminal and information indicating a TM may also be added to the RRC signaling for transmission based on a correspondence between a transmission mode (TM) and a DCI format.

For example:

```
AntennaInfoDedicated ::=   SEQUENCE {
transmissionMode           ENUMERATED {
                               tm1, tm2, tm3, tm4, tm5,
tm6, tm7, tm8-v920,
                               tm9-v1020,
                               tm10-v1130-format 2d,
                               tm10-v1130-format 2e,
spare6, spare5, spare4,
                               spare3, spare2, spare1},
codebookSubsetRestriction-r10     BIT STRING      OPTIONAL,--   Cond
TMX
ue-TransmitAntennaSelection   CHOICE{
    release                       NULL,
    setup                         ENUMERATED {closedLoop,
        openLoop}
    }
}
```

The above content is used to indicate the DCI format supported by the terminal. After receiving the signaling, the base station may determine, based on the DCI format supported by the terminal, whether the terminal supports the NCJT.

Certainly, the capability indication information may be transmitted together with the TM, or the capability indication information and the TM may be separately transmitted.

For example:

```
         AntennaInfoDedicated ::=     SEQUENCE {
         transmissionMode             ENUMERATED {
                                           tm1, tm2, tm3, tm4, tm5,
         tm6, tm7, tm8-v920,
                                           tm9-v1020,
                                           tm10-v1130,
                                           spare6, spare5, spare4,
                                           spare3, spare2, spare1},
         DCI format for tm10   ENUMERATED {format 2d, format 2e}
         codebookSubsetRestriction-r10    BIT STRING    OPTIONAL,--   Cond
TMX
         ue-TransmitAntennaSelection   CHOICE{
           release                       NULL,
           setup                         ENUMERATED {closedLoop,
                openLoop}
         }
     }
```

The above content is used to indicate the DCI format supported by the terminal. After receiving the signaling, the base station may determine, based on the DCI format supported by the terminal, whether the terminal supports the NCJT.

That the terminal explicitly reports the capability indication information indicating whether the terminal supports the NCJT is described above. In addition to explicit reporting, the terminal may also implicitly report the capability indication information, and then the base station determines, based on content included in the capability indication information, whether the terminal supports the NCJT.

In one embodiment, when whether the terminal supports the NCJT is implicitly indicated, the capability indication information may include but is not limited to at least one of the following information:

a maximum quantity of information transmission layers that is supported by the terminal;

a maximum throughput supported by the terminal;

a maximum quantity of code words that is supported by the terminal; and whether the terminal supports a capability of a successive interference cancellation (SIC) receiver or a parallel interference cancellation (PIC) receiver.

For example, a user of four transmit four receive (4T4R) may support four-layer transmission, and then it may be considered that the terminal supports the NCJT.

For another example, if the maximum throughput supported by the terminal reaches a preset threshold, it may be considered that the terminal supports the NCJT.

If the maximum quantity of code words that is supported by the terminal reaches a preset quantity of code words, it may be considered that the terminal supports the NCJT.

If the terminal has the capability of the SIC (successive interference cancellation) receiver or the PIC (parallel interference cancellation) receiver, it is considered that the terminal supports the NCJT.

Certainly, the foregoing conditions are included but not limited to being used as a single determining standard, or two or more of the foregoing conditions may be combined to be used as a standard for determining whether the terminal supports the NCJT.

For example, if a throughput that may be supported by the user of 4T4R is greater than a threshold, it may be considered that the terminal supports the NCJT. This is not limited in this embodiment of the present application.

After determining a capability of the terminal based on the capability indication information of the terminal, the base station side may deliver the DCI based on the capability indication information of the terminal.

In one embodiment, the terminal may further receive a parameter of the downlink control information from the base station. The parameter includes the downlink control information format and/or a maximum quantity of to-be-sent downlink control information, and the parameter is based on the capability indication information.

After receiving these parameters, the terminal may determine the DCI format that needs to be detected and a quantity of DCI that needs to be detected.

In this embodiment, the terminal reports the capability indication information indicating whether the terminal supports the NCJT, so that the base station can accurately know whether the terminal supports the NCJT, and then select an appropriate transmission mode to send appropriate DCI, thereby improving system efficiency and facilitating normal running of the NCJT.

Figure 3:
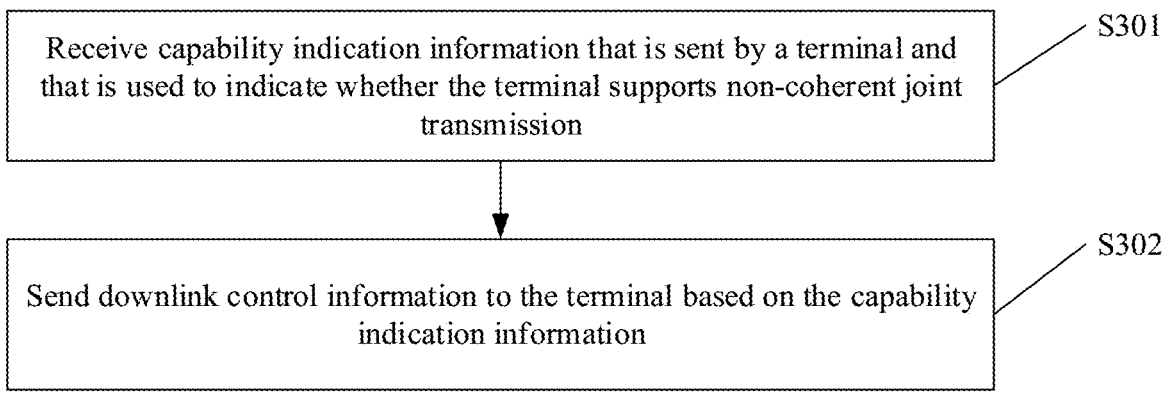
FIG. 3 is a schematic flowchart of another information transmission method according to an embodiment of this application.

FIG. 3 is a schematic flowchart of another information transmission method according to an embodiment of this application. The method includes but is not limited to the following operations.

S301. Receive capability indication information that is sent by a terminal and that is used to indicate whether the terminal supports non-coherent joint transmission.

S302. Send downlink control information to the terminal based on the capability indication information.

In one embodiment, receiving the capability indication information and sending the downlink control information may be implemented by one base station. The base station may be a serving base station or a coordinated base station. This is not limited in this embodiment of the present application. The base station may include at least one TRP or at least one radio remote unit (RRU).

In one embodiment, the capability indication information is used to indicate whether the terminal supports receiving of at least two pieces of downlink control information and/or is used to indicate whether the terminal supports a downlink control information format corresponding to the non-coherent joint transmission.

The capability indication information may be included in higher layer signaling.

In one embodiment, the capability indication information includes but is not limited to at least one of the following information:

a maximum quantity of information transmission layers that is supported by the terminal;

a maximum throughput supported by the terminal;

a maximum quantity of code words that is supported by the terminal; and whether the terminal has a capability of a successive interference cancellation receiver or a parallel interference cancellation receiver.

FIG. 3 is a description of an embodiment on a base station side. For a process and an embodiment thereof, refer to the description of the embodiment on a terminal side shown in FIG. 2. Details are not described herein again.

Figure 4:
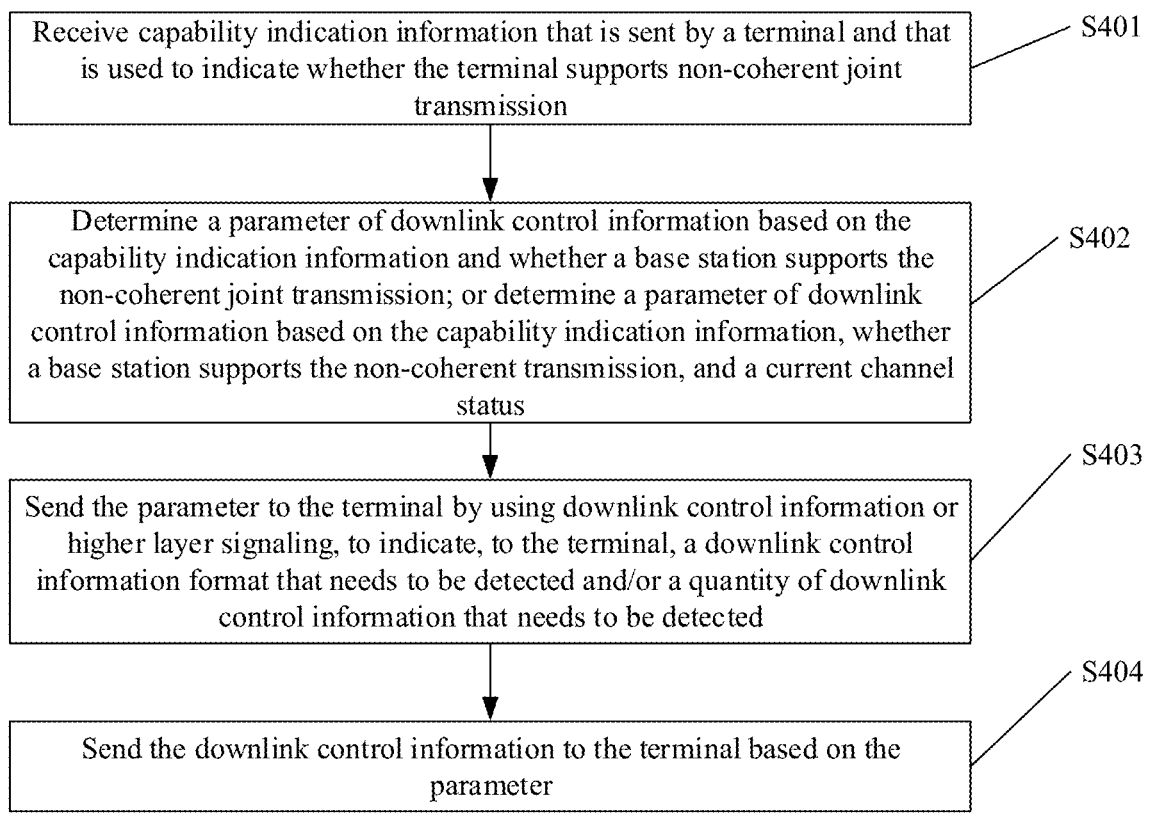
FIG. 4 is a schematic flowchart of still another information transmission method according to an embodiment of this application.

FIG. 4 is a schematic flowchart of still another information transmission method according to an embodiment of this application. The method includes but is not limited to the following operations.

S401. Receive capability indication information that is sent by a terminal and that is used to indicate whether the terminal supports non-coherent joint transmission.

S402. Determine a parameter of downlink control information based on the capability indication information and whether the base station supports the non-coherent joint transmission; or determine a parameter of downlink control information based on the capability indication information, whether the base station supports the non-coherent joint transmission, and a current channel status.

The parameter includes a downlink control information format and/or a maximum quantity of to-be-sent downlink control information.

In one embodiment, in the embodiment shown in FIG. 3, the base station supports the NCJT by default. In actual application, the base station may or may not support the NCJT. Therefore, when receiving the capability indication information reported by the terminal, in addition to configuring the parameter of the to-be-sent DCI based on the capability indication information of the terminal, the base station may further configure the parameter, such as the maximum quantity of to-be-sent DCI or the format of the to-be-sent DCI, of the to-be-sent DCI based on whether the base station supports the NCJT.

Certainly, if both the base station and the terminal support the NCJT, but the current channel status is poor, the NCJT is not an appropriate solution. In this case, the base station may still send only a single piece of conventional DCI. The current channel status may be measured by using channel state information (CSI) or reference signal received power (RSRP), and indicators in other forms are not limited in the present application either. In one embodiment, a preset threshold may be set for comparison, and the current channel status is determined based on a comparison result. Details are not described herein again.

S403. Send the parameter to the terminal by using downlink control information or higher layer signaling, to indicate, to the terminal, the downlink control information format that needs to be detected and/or a quantity of downlink control information that needs to be detected.

After configuring the parameter of the to-be-sent DCI, the base station may send the parameter to the terminal. In one embodiment, the base station may send the parameter by using the DCI or the higher layer signaling such as MAC signaling or RRC signaling.

When sending the parameter by using the DCI, the base station may first use one piece of conventional DCI to carry the foregoing parameter. If the parameter indicates that the NCJT transmission may be used, a plurality of pieces of DCI are subsequently selected for delivery or a new DCI format used for supporting the NCJT for delivery is subsequently selected for delivery, based on the parameter.

S404. Send the downlink control information to the terminal based on the parameter.

It should be noted that, when sending the DCI based on the parameter, the base station may use the parameter as a reference. For example, a configured maximum quantity of to-be-sent DCI in the parameter is 4, and the base station may send four pieces of DCI, or may send fewer than four pieces of DCI. This is not limited in this embodiment of the present application.

In this embodiment, an operation of configuring the parameter of the DCI by the base station is added, and the operation is applicable to various cases based on capabilities of devices at two ends and the channel status, so that an information transmission mode is more flexible, and system adaptability is improved.

Figure 5:
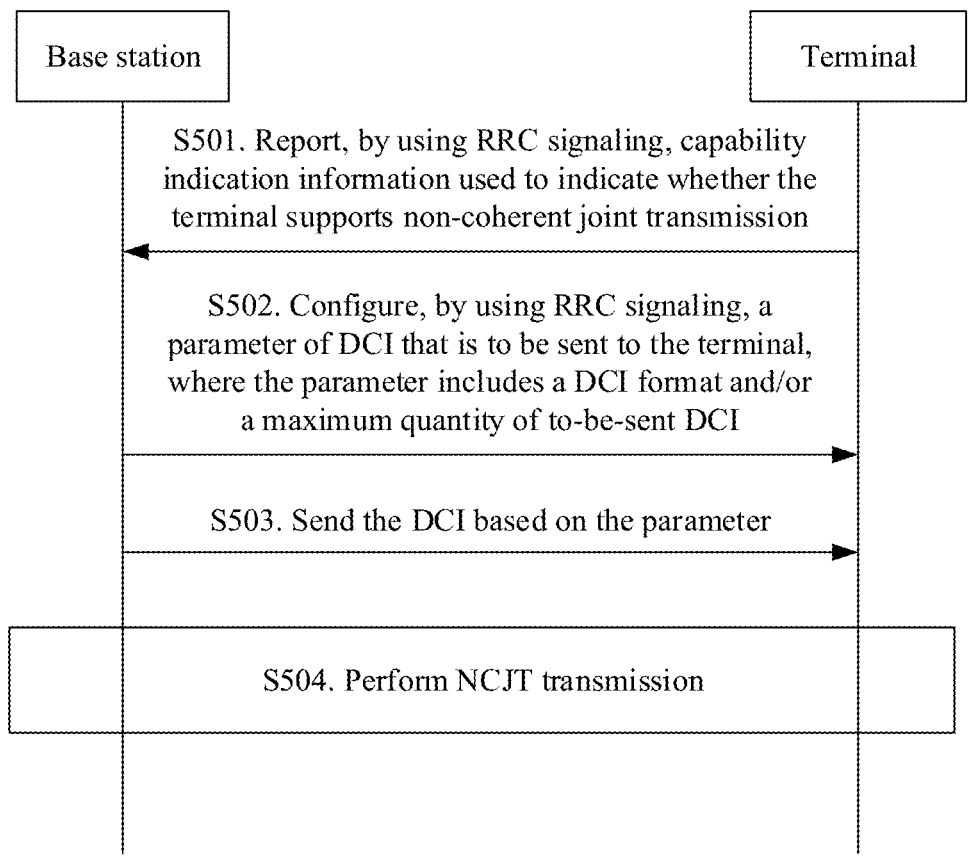
FIG. 5 is a schematic diagram of information interaction in an information transmission method according to an embodiment of this application.

FIG. 5 is a schematic diagram of information interaction in an information transmission method according to an embodiment of this application. The method includes but is not limited to the following operations.

S501. Report, by using RRC signaling, capability indication information used to indicate whether the terminal supports non-coherent joint transmission.

For a reporting process and manner, refer to the description of the embodiment shown in FIG. 2. Details are not described herein again.

S502. Configure, by using RRC signaling, a parameter of DCI that is to be sent to the terminal.

The parameter may include but is not limited to a DCI format and/or a maximum quantity of to-be-sent DCI.

For a process of configuring the parameter of the DCI, refer to the description of the embodiment shown in FIG. 4. Details are not described herein again.

S503. Send the DCI based on the parameter.

After receiving the DCI, the terminal may perform, based on the received parameter, blind detection on the DCI in a TM 10 or another transmission mode corresponding to the NCJT. For example, if the parameter indicates that the maximum quantity of to-be-sent DCI is 2, the terminal stops detection after two pieces of DCI are obtained through detection. For another example, if the parameter indicates that the format of the to-be-sent DCI is a DCI format 2E, the terminal performs blind detection on the DCI format.

S504. Perform NCJT transmission based on the sent DCI.

After learning of a capability of the terminal and determining a quantity and/or a format of to-be-delivered DCI based on another factor, the base station delivers the DCI. After receiving the DCI, the terminal may perform the NCJT based on the DCI.

The methods in the embodiments of this application are described above in detail, and the following describes an apparatus in the embodiments of this application.

Figure 6:
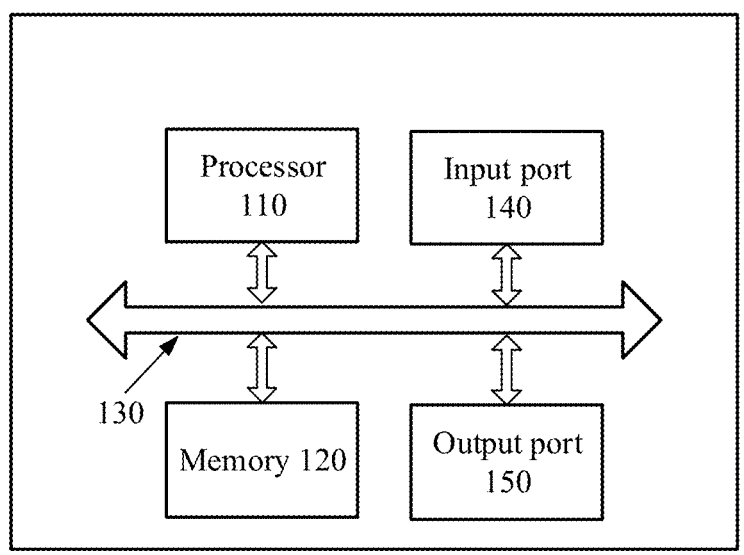
FIG. 6 is a schematic composition diagram of an apparatus according to an embodiment of this application.

According to the foregoing methods, FIG. 6 is a schematic composition diagram of an apparatus according to an embodiment of this application. As shown in FIG. 6, the apparatus may be a terminal, or may be a chip or a circuit, for example, a chip or a circuit that may be disposed in a terminal. The terminal may correspond to the terminal in the foregoing methods.

The apparatus may include a processor 110 and a memory 120. The memory 120 is configured to store an instruction, and the processor 110 is configured to execute the instruction stored in the memory 120, so as to implement the operations in the method corresponding to FIG. 2.

Further, the apparatus may include an input port 140 and an output port 150. Further, the apparatus may include a bus system 130. The processor 110, the memory 120, the input port 140, and the output port 150 may be connected by using the bus system 130.

The processor 110 is configured to execute the instruction stored in the memory 120, to control the input port 140 to receive a signal and control the output port 150 to send a signal, so as to complete the operations performed by the terminal in the foregoing methods. The input port 140 and the output port 150 may be a same physical entity or different physical entities. When being the same physical entity, the input port 140 and the output port 150 may be collectively referred to as an input/output port. The memory 120 may be integrated into the processor 110, or may be separated from the processor 110.

In one embodiment, functions of the input port 140 and the output port 150 may be implemented by using a transceiver circuit or a dedicated transceiver chip. The processor 110 may be implemented by using a dedicated processing chip, processing circuit, or processor, or a general chip.

In one embodiment, it may be considered that the terminal provided in this embodiment of this application is implemented by using a general-purpose computer. In one embodiment, program code that is used to implement functions of the processor 110, the input port 140, and the output port 150 is stored in the memory, and a general purpose computer executes the code in the memory, to implement the functions of the processor 110, the input port 140, and the output port 150.

For concepts, explanations, detailed descriptions, and other operations used by the apparatus and related to the technical solutions provided in the embodiments of this application, refer to the descriptions of the content in the foregoing method or other embodiments. Details are not described herein again.

Figure 7:
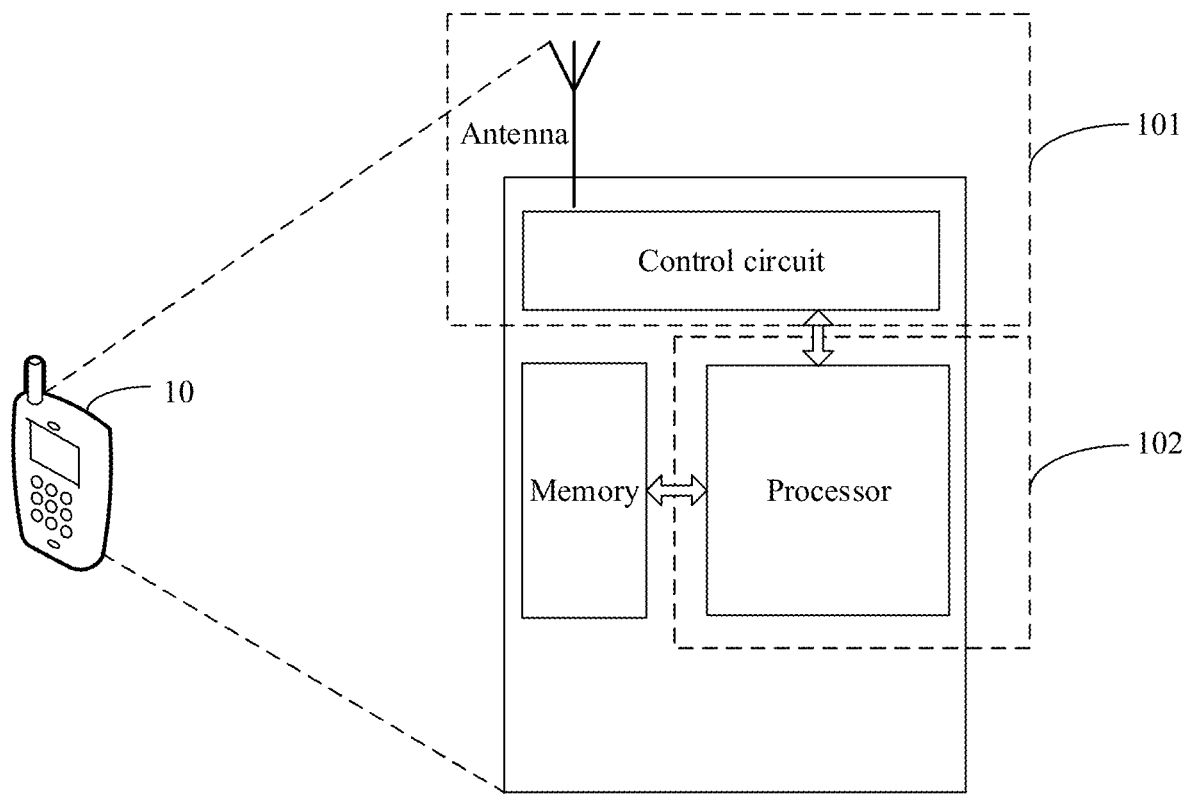
FIG. 7 is a schematic structural diagram of a terminal according to an embodiment of this application.

FIG. 7 is a schematic structural diagram of a terminal device according to this application. The terminal is applicable to the system shown in FIG. 1. For ease of description, FIG. 7 shows only main components of the terminal. As shown in FIG. 7, the terminal includes a processor, a memory, a control circuit, and an antenna. The processor is mainly configured to: process a communications protocol and communication data, control the entire terminal, execute a software program, and process data of the software program, for example, configured to support the terminal in performing the actions described in the foregoing information transmission method embodiments. The memory is mainly configured to store a software program and data, for example, store the capability indication information described in the foregoing embodiments. The control circuit is mainly configured to convert a baseband signal and a radio frequency signal and process the radio frequency signal. The control circuit and the antenna may be collectively referred to as a transceiver that is mainly configured to receive and send a radio frequency signal in an electromagnetic wave form.

After the terminal is powered on, the processor may read the software program in the storage unit, interpret and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 7 shows only one memory and only one processor. Actually, the terminal may include a plurality of processors and a plurality of memories. The memory may also be referred to as a storage medium, a storage device, or the like. This is not limited in this embodiment of the present application.

In one embodiment, the processor may include a baseband processor and a central processing unit. The baseband processor is mainly configured to process the communications protocol and the communication data, and the central processing unit is mainly configured to: control the entire terminal, execute the software program, and process the data of the software program. The processor in FIG. 7 integrates functions of the baseband processor and the central processing unit. A person skilled in the art may understand that the baseband processor and the central processing unit may be separate processors, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communications protocol and the communication data may be embedded into the processor, or may be stored in the storage unit in a form of a software program, and the processor executes the software program to implement a baseband processing function.

For example, in this embodiment of the present application, the antenna and the control circuit that have receiving and sending functions may be considered as a transceiver unit 101 of the terminal, and the processor having a processing function may be considered as a processing unit 102 of a terminal device 10. As shown in FIG. 7, the terminal device 10 includes the transceiver unit 101 and the processing unit 102. The transceiver unit may also be referred to as a transceiver, a transceiving machine, a transceiver apparatus, or the like. In one embodiment, a component that is in the transceiver unit 101 and is configured to implement a receiving function may be considered as a receiving unit, and a component that is in the transceiver unit 101 and is configured to implement a sending function may be considered as a sending unit. In other words, the transceiver unit 101 includes the receiving unit and the sending unit. For example, the receiving unit may also be referred to as a receiver, a receiving machine, a receiver circuit, or the like, and the sending unit may be referred to as a transmitter, a transmitting machine, a transmit circuit, or the like.

Figure 8:
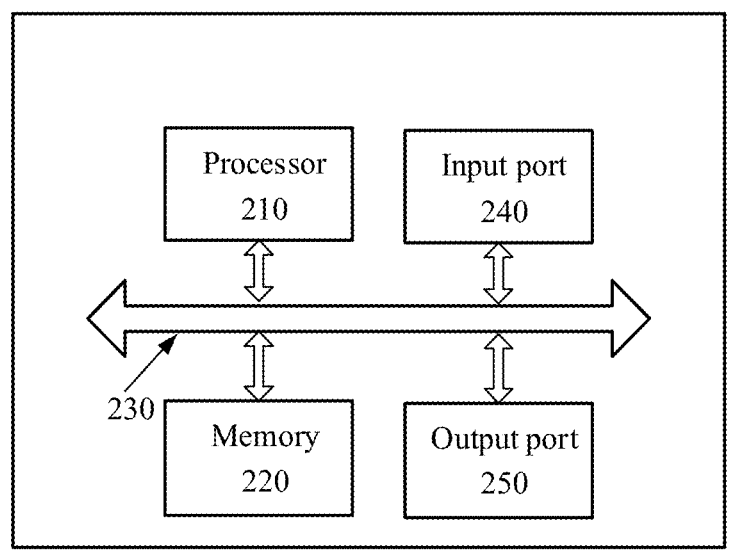
FIG. 8 is a schematic composition diagram of another apparatus according to an embodiment of this application.

According to the foregoing methods, FIG. 8 is a schematic composition diagram of another apparatus according to an embodiment of this application. As shown in FIG. 8, the apparatus may be a base station, or may be a chip or a circuit, for example, a chip or a circuit that may be disposed in a base station. The base station corresponds to the base station in the foregoing methods. The apparatus may include a processor 210 and a memory 220. The memory 220 is configured to store an instruction, and the processor 210 is configured to execute the instruction stored in the memory 220, so that the apparatus implements the method corresponding to any one of FIG. 3 to FIG. 5.

Further, the apparatus may include an input port 240 and an output port 250. Furthermore, the apparatus may include a bus system 230.

The processor 210, the memory 220, the input port 240, and the output port 250 are connected by using the bus system 230. The processor 210 is configured to execute the instruction stored in the memory 220, to control the input port 240 to receive a signal and control the output port 250 to send a signal, so as to complete the operations of the base station in the foregoing methods. The input port 240 and the output port 250 may be a same physical entity or different physical entities. When being the same physical entity, the input port 140 and the output port 150 may be collectively referred to as an input/output port. The memory 220 may be integrated into the processor 210, or may be separated from the processor 210.

In one embodiment, functions of the input port 240 and the output port 250 may be implemented by using a transceiver circuit or a dedicated transceiver chip. The processor 210 may be implemented by using a dedicated processing chip, processing circuit, or processor, or a general chip.

In one embodiment, it may be considered that the base station provided in this embodiment of this application is implemented by using a general-purpose computer. In one embodiment, program code that is used to implement functions of the processor 210, the input port 240, and the output port 250 is stored in the memory, and a general purpose computer executes the code in the memory, to implement the functions of the processor 210, the input port 240, and the output port 250.

For concepts, explanations, detailed descriptions, and other operations used by the base station and related to the technical solutions provided in the embodiments of this application, refer to the descriptions of the content in the foregoing method or other embodiments. Details are not described herein again.

Figure 9:
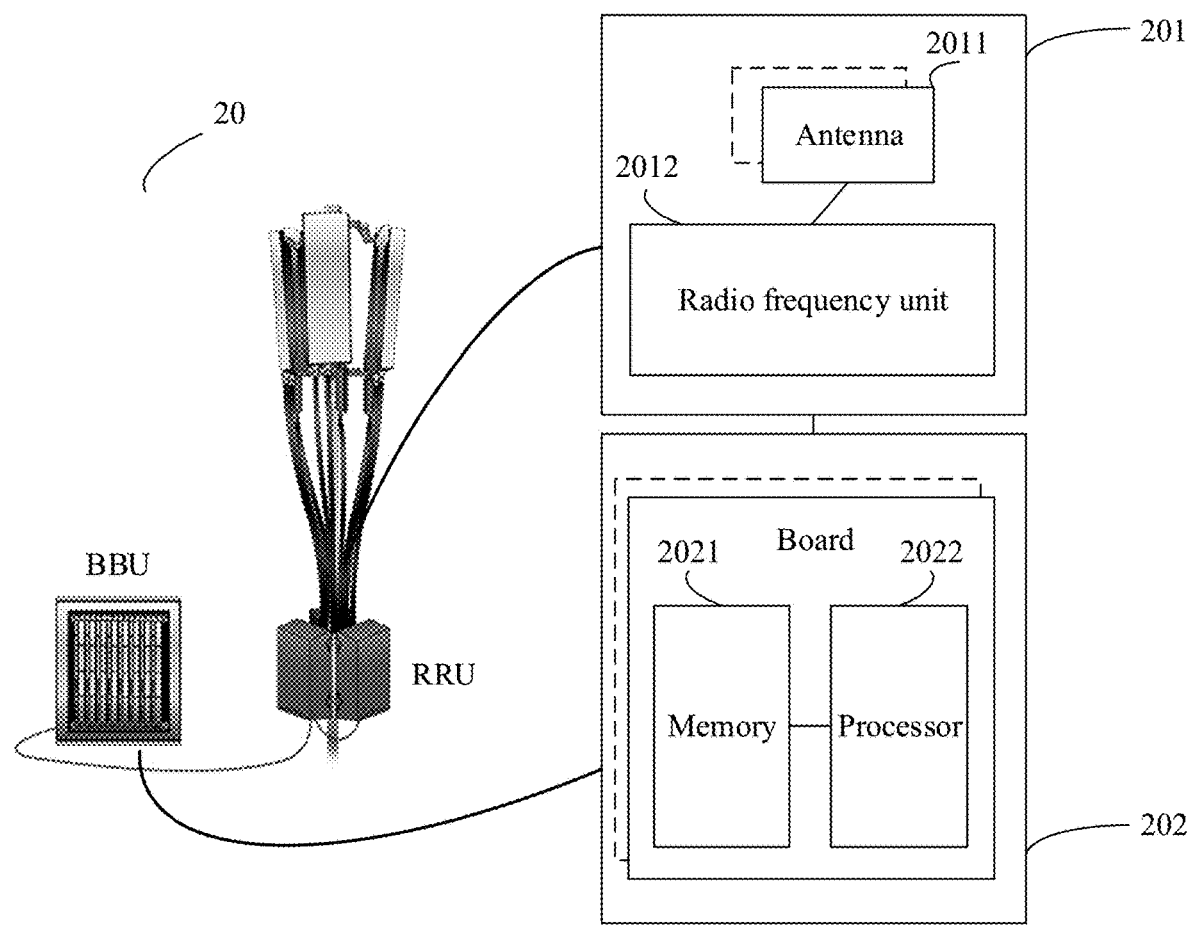
FIG. 9 is a schematic structural diagram of a base station according to an embodiment of this application.

According to the foregoing methods, FIG. 9 is a schematic structural diagram of a base station according to an embodiment of this application. As shown in FIG. 9, the base station may be applied to the system shown in FIG. 1. The base station includes one or more radio frequency units, such as a remote radio unit (RRU) 201 and one or more baseband units (BBU) (which is also referred to as a digital unit (DU)) 202. The RRU 201 may be referred to as a transceiver unit, a transceiver, a transceiver circuit, a transceiver, or the like, and may include at least one antenna 2011 and a radio frequency unit 2012. The RRU 201 is mainly configured to transmit and receive a radio frequency signal and convert the radio frequency signal and a baseband signal, for example, configured to send the signaling message in the foregoing embodiments to a terminal. The BBU 202 is mainly configured to perform baseband processing, control the base station, and the like. The RRU 201 and the BBU 202 may be physically disposed together, or may be physically separated, namely, a distributed base station.

The BBU 202 is a control center of the base station, or may be referred to as a processing unit, and is mainly configured to complete baseband processing functions such as channel coding, multiplexing, modulation, and spectrum spreading. For example, the BBU (the processing unit) may be configured to control the base station to execute an operation procedure related to the base station in the foregoing method embodiments.

In an example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store an instruction and data. For example, the memory 2021 stores the capability indication information, the parameter of the DCI, and the like in the foregoing embodiments. The processor 2022 is configured to control the base station to perform actions. For example, the processor 2022 is configured to control the base station to execute the operation procedure related to the base station in the foregoing method embodiments. The memory 2021 and the processor 2022 may serve one or more boards. In other words, a memory and a processor may be separately disposed on each board. Alternatively, a plurality of boards may share a same memory and a same processor. In addition, a circuit may be further disposed on each board.

According to the methods provided in the embodiments of this application, an embodiment of this application further provides a communications system, and the communications system includes the foregoing base station and one or more terminals.

It should be understood that in the embodiment of this application, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may alternatively be any conventional processor or the like.

The memory may include a read-only memory and a random access memory, and provide an instruction and data for the processor. A part of the memory may further include a non-volatile random access memory.

In addition to a data bus, the bus system may further include a power bus, a control bus, a status signal bus, and the like. However, for clear description, various types of buses in the figures are marked as the bus system.

In one embodiment process, the operations in the foregoing methods can be completed by using an integrated logic circuit of hardware in the processor, or by using an instruction in a form of software. The operations in the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein.

It should further be understood that the numbers such as "first", "second", "third", and "fourth" included in this specification are merely for distinguishing purposes for ease of description, and are not intended to limit the scope of the embodiments of the present application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually represents an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present application.

A person of ordinary skill in the art may be aware that, in combination with illustrative logical blocks and operations described in the embodiments disclosed in this specification, embodiments can be implemented by electronic hardware or a combination of computer software and electronic hardware. Whether these functions are executed in a hardware or software mode depends on applications and design constraints of the technical solutions. A person skilled in the art may use different methods to implement the described functions for each particular application, but it should not be considered that such implementation goes beyond the scope of the present application.

It may be clearly understood by a person skilled in the art that, for the purpose of convenient and brief description, for a working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one place, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to the embodiments of the present application are all or partially generated. The computer may be a general-purpose computer, a dedicated computer, a computer network, or another programmable apparatus. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semi-conductor medium (for example, a Solid State Disk (SSD)), or the like.

The foregoing descriptions are only described embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for information transmission comprising:
sending, to a base station, capability indication information used to indicate whether a terminal supports non-coherent joint transmission, wherein the capability indication information is used to indicate whether the terminal supports receiving at least two pieces of downlink control information;
receiving a parameter of the downlink control information from the base station, wherein the parameter comprises a maximum quantity of to-be-sent downlink control information and the parameter is based on the capability indication information; and
receiving downlink control information from the base station, wherein the downlink control information is based on the capability indication information.

2. The method according to claim 1, wherein the parameter further comprises a downlink control information format.

3. The method according to claim 1, wherein the capability indication information is further used to indicate whether the terminal supports a downlink control information format corresponding to the non-coherent joint transmission.

4. The method according to claim 1, wherein the capability indication information further comprises whether the terminal has a capability of a successive interference cancellation receiver or a parallel interference cancellation receiver.

5. The method according to claim 1, wherein the capability indication information is carried in higher layer signaling.

6. A method for information transmission comprising:
receiving capability indication information that is received from a terminal and used to indicate whether the terminal supports non-coherent joint transmission, wherein the capability indication information is used to indicate whether the terminal supports receiving at least two pieces of downlink control information;

determining a parameter of the downlink control information based on the capability indication information, wherein the parameter comprises a maximum quantity of to-be-sent downlink control information; and sending the downlink control information and the parameter to the terminal based on the capability indication information.

7. The method according to claim 6, wherein the sending the downlink control information and the parameter to the terminal based on the capability indication information comprises:

sending higher layer signaling to the terminal to indicate a quantity of downlink control information that needs to be detected; and sending the downlink control information to the terminal based on the parameter.

8. The method according to claim 6, wherein the capability indication information is further used to indicate whether the terminal supports a downlink control information format corresponding to the non-coherent joint transmission.

9. The method according to claim 6, wherein the capability indication information further comprises whether the terminal has a capability of a successive interference cancellation receiver or a parallel interference cancellation receiver.

10. The method according to claim 8, wherein the capability indication information is comprised in higher layer signaling.

11. An apparatus comprising:

a processor;

and a memory, wherein the memory is configured to store a program code including instructions, which, when executed by the processor, causes the processor to perform a method comprising:

sending, to a base station, capability indication information used to indicate whether a terminal supports non-coherent joint transmission, wherein the capability indication information is used to indicate whether the terminal supports receiving at least two pieces of downlink control information;

receiving a parameter of the downlink control information from the base station, wherein the parameter comprises a maximum quantity of to-be-sent downlink control information and the parameter is based on the capability indication information; and receiving the downlink control information from the base station, wherein the downlink control information is based on the capability indication information.

12. The apparatus according to claim 11, wherein the parameter further comprises a downlink control information format.

13. The apparatus according to claim 11, wherein the capability indication information is further used to indicate whether the terminal supports a downlink control information format corresponding to the non-coherent joint transmission.

14. The apparatus according to claim 11, wherein the capability indication information further comprises whether the terminal has a capability of a successive interference cancellation receiver or a parallel interference cancellation receiver.

15. The apparatus according to claim 11, wherein the capability indication information is carried in higher layer signaling.

16. An apparatus comprising:

a processor; and a memory, wherein the memory is configured to store a program code including instructions, which, when executed by the processor, causes the processor to perform a method comprising:

receiving capability indication information that is from a terminal and used to indicate whether the terminal supports non-coherent joint transmission, wherein the capability indication information is used to indicate whether the terminal supports receiving at least two pieces of downlink control information;

determining a parameter of the downlink control information based on the capability indication information and whether a base station supports the non-coherent joint transmission, wherein the parameter comprises a maximum quantity of to-be-sent downlink control information; and sending the downlink control information and the parameter to the terminal based on the capability indication information.

17. The apparatus according to claim 16, wherein the program code further comprises instructions, which, when executed by the processor, causes the processor to perform the following:

sending higher layer signaling to the terminal to indicate a quantity of downlink control information that needs to be detected; and sending the downlink control information to the terminal based on the parameter when the parameter is sent by using the higher layer signaling.

18. The apparatus according to claim 16, wherein the capability indication information is further used to indicate whether the terminal supports a downlink control information format corresponding to the non-coherent joint transmission.

19. The apparatus according to claim 16, wherein the capability indication information further comprises whether the terminal has a capability of a successive interference cancellation receiver or a parallel interference cancellation receiver.

20. The apparatus according to claim 16, wherein the capability indication information is comprised in higher layer signaling.

* * * * *